Patented Apr. 23, 1940

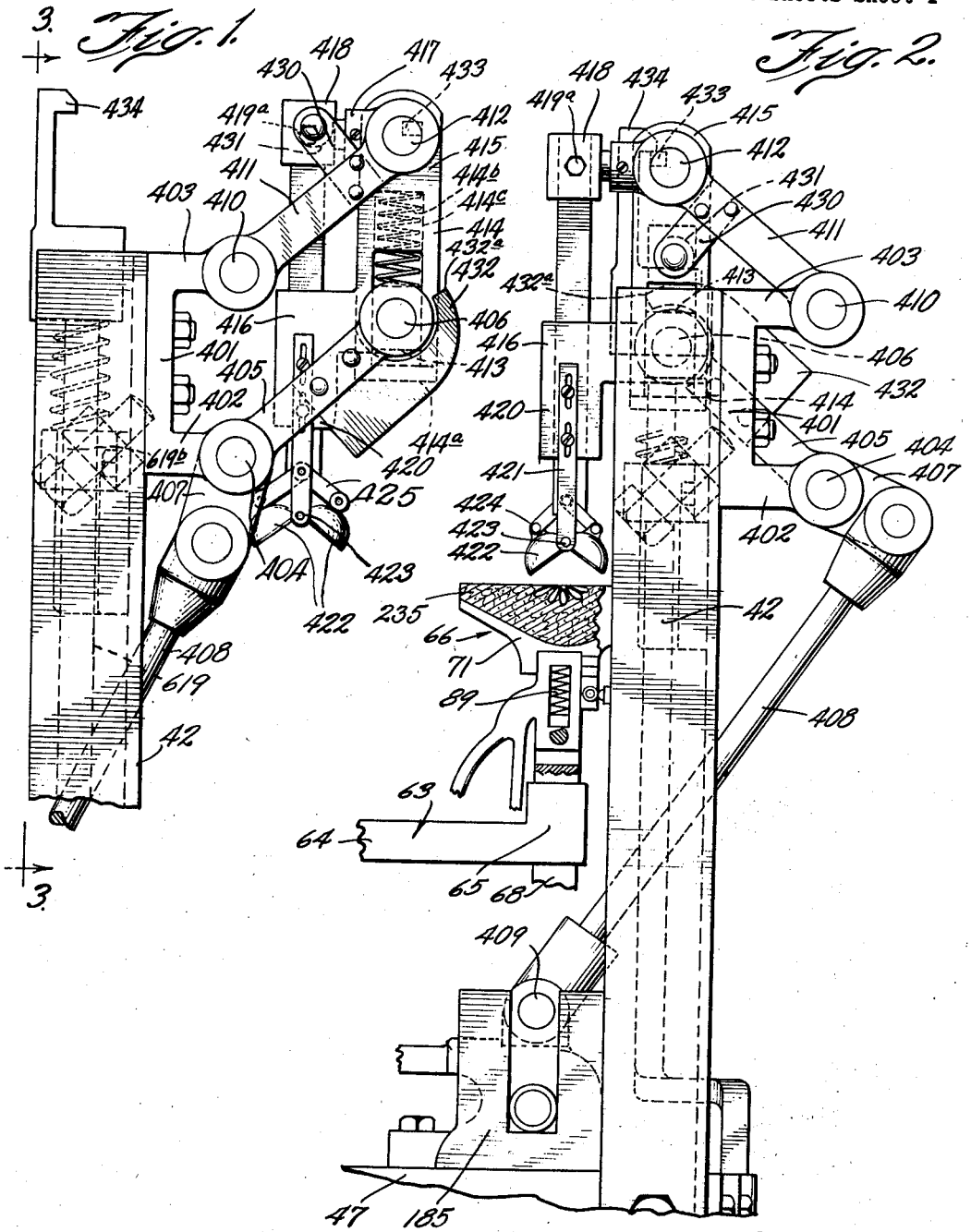

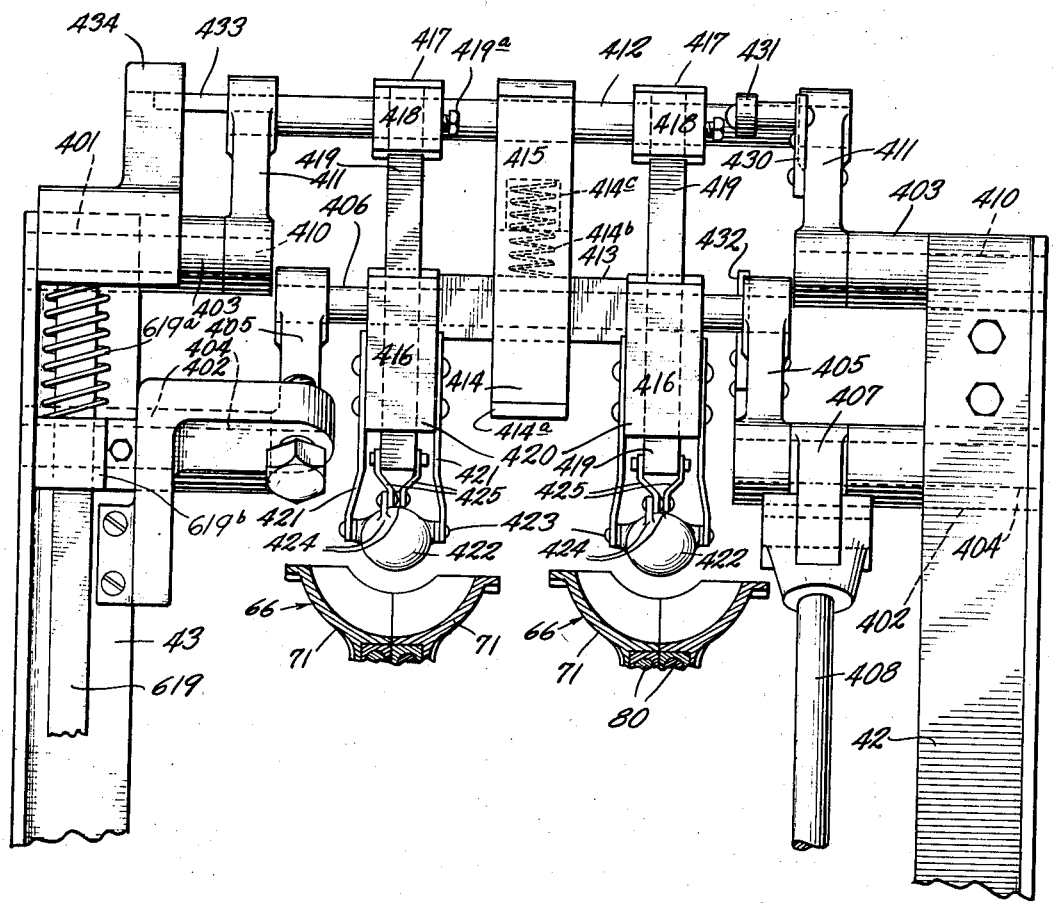

2,197,794

UNITED STATES PATENT OFFICE 2,197,794

METHOD OF AND APPARATUS FOR TREATING FRUIT

Mark Ewald, Olympia, Wash., assignor to Special Equipment Company, Portland, Oreg., a corporation of Oregon Application March 23, 1934, Serial No. 716,988
Renewed February 6, 1939

28 Claims. (Cl. 146—52)

The present application for Letters Patent is a continuation in part of the co-pending application of the applicant, Mark Ewald, filed January 20, 1930, Serial Number 421,954, and entitled Slicer and peeler, now Patent 1,989,090 issued January 29, 1935.

For its objects, the present device includes:

The provision of novel means for severing the seed containing section of a half fruit.

The provision of an automatic machine for automatically and intermittently moving fruit holders, each carrying a half fruit to a pitting or coring station wherein pitting or coring mechanism is automatically positioned onto the face of the fruit at the pit or core thereof and wherein means is subsequently actuated for causing the pitting and coring means, preferably in the form of blade-like elements, segments of shells with substantially semi-circular cutting edges, to move in unison to cut through the flesh of the fruit following substantially closely the outline of the core or pit of the fruit and subsequently to move away from the fruit cups whereby to permit succeeding fruit cups to be brought to the coring or pitting station in a complete synchronized cyclical movement.

The provision of an automatic pitting or coring mechanism for an automatic fruit treating machine wherein a plurality of pitting or coring elements are automatically moved contiguous or adjacent the cut face of the fruit and directly over the core or pit area of the fruit and wherein pitting and coring movement is imparted to the opposed scoop-like members whereby to cut through the flesh of the fruit around and under the pit or core to substantially enclose the pit or the core so that upon the completion of the pitting or coring operation the pit or core will be enclosed and detached and separated from the fruit proper.

The provision of a cutting and coring apparatus wherein opposed scoop-like coring or pitting elements are adapted to be presented to the cut face of the fruit at the margin of the pit or core and are adapted thereafter to move arcuately about a center substantially close to the center of the core or the pit so as to form a substantially shallow pitting or coring cut to remove the core or pit and a minimum amount of the flesh of the fruit therewith and whereby also preferably to encompass the core or pit to remove it from the fruit.

The provision of an automatic coring or pitting device comprising one or more fruit holders adapted to receive a half fruit with the cut face uppermost and wherein coring or pitting means in the form of opposed scoops are provided, each of said scoops providing a substantially semi-circular cutting edge and wherein the scoops are positioned on opposite sides of the core or pit zone to be cut and are then moved through the flesh of the fruit in arcuate paths approaching each other beneath the core or pit of the fruit to form a partial coring or pitting operation leaving an integral portion of the flesh of the fruit integrally united to the core or pit and wherein this partial coring or pitting operation is followed by a completion of the coring or pitting operation under circumstances wherein the body of the half fruit has a force exerted on it downwardly away from the core or pit which is retained in the pitting cutters whereby during the completion of the coring or pitting cup and due to the downward pressure of the fruit at the uncut portion, the cutters will move more closely to the exact marginal zone of the core or pit whereby to make a cleaner cut and whereby the minimum of fruit flesh is cut with the core or the pit.

The provision of an improved process for coring or pitting the fruit wherein simultaneously approaching cuts are made in the flesh of the fruit beginning at the cut face of the fruit at the juncture of the core or pit and arcuately following the border line of the core or pit and wherein during the approaching cutting movements, the body of the fruit is subjected to a downward stress which causes a similar stress upon the uncut zone of the fruit in the path of the approaching lines of cut whereby to cause the cutting action more closely to follow the exact outline of the core or pit of the fruit.

A new and novel coring device operable to convey fruit and later discharge it upon a moving conveyor or elsewhere pursuant to removing the core therefrom.

The provision of an unique coring device of the clam shell type wherein scoops are adapted, first, to engage a half fruit adjacent its core and partly sever the core therefrom, next, to conduct the fruit to a desired position and lastly, to complete the severing of the core from the fruit after the fruit has been conveyed to the desired position.

The above, and other desirable objects of the invention, will become apparent upon reading the following description in conjunction with the accompanying two sheets of drawings, hereby made a part of this application, and in which:

Figure 1 is a fragmentary view of a fruit treating machine illustrating one of the uprights thereof and the present seed severing device, the latter being in side elevation and at one stage of its operation;

Figure 2 is a view similar to Figure 1 illustrating more of the machine in which the device is used and shows the device in another stage of operation; and Figure 3 is an elevation of the present device, the view being in the direction indicated by the arrows 3—3 of Figure 1.

Like reference characters are used in the drawings and throughout the description that follows for designating similar parts of the device. Whenever possible, the same reference characters are used in the present application as were used in my prior mentioned patent of which this is a continuation in part.

The machine used to illustrate the present invention comprises a frame of four upright angle pieces equally spaced from one another about the four corners of a square. Only two of such uprights are shown in the present drawing, those two uprights being disposed at one side of the frame and being identified by the reference characters 42 and 43. The upright 42 is shown in Figures 1 and 2. In Figure 3, both of the uprights are illustrated.

Parts of the present device serve to hold the upper ends of the frame members 42 and 43 in a spaced relation. Side bars and cross-tie members, not important in the present disclosure, and of which but one (47) is shown, are employed for bracing the lower ends of frame members 42 and 43 and for holding several upright members in rigid assembly.

Mounted centrally of the several frame members is a turret 63 rotatable on a vertical axis. Four pairs of arms 64 radiate outwardly and horizontally from the axis of rotation of the turret or spider 63. Within the end of each of the arms 64 is a bearing member 65 in which a stem 68 reciprocates vertically. Upon each of the reciprocable stems 68 is mounted fruit holding means herein specifically shown as a fruit holding cup 66 comprising relatively movable segments 71. Each of the cup segments 71 is pivotally supported upon a pin 80. A spring 89 yieldingly supports the segment so that the segment may be resiliently depressed while peel is being cut from a fruit contained in the cup. The exact operation of the relatively movable parts of the fruit receptacle and their cooperation with the peeling mechanism is recited in the application of which this is a continuation in part.

The fruit cups as shown are reciprocably disposed within the machine upon the stems 68. Such stems and cups remain at the lowermost of their reciprocable limits during cooperation with the present device. The position of the cups at the time the present device is operative determines the proper plane of the cups. The device is equally operative with cups that do not reciprocate.

Means (not shown) are provided for intermittently rotating the spider or turret 63 to successively carry each pair of the fruit cups 66 to the station at which the present means for removing the seed containing section is disposed, that is, to carry each pair of the fruit cups to a position between the uprights 42 and 43 where they remain for an interval while the seed removing device performs its operations upon the fruit.

Upon each of the legs 42 and 43 is a U-shaped member or two-legged bracket 401, which is illustrated in each of the Figures 1, 2 and 3. The brackets are secured in position by bolts or the like. Each bracket 401 has legs 402 and 403 which provide a pivot or bearing for apparatus to be described. One bracket is a right-hand member, and the other is a left-hand member, and the two are complemental and opposed. The seed removing apparatus is disposed intermediate such opposed complemental brackets.

The seed removing means specifically comprises a pair of cutting members operating in unison. These paired instruments are complemental to the paired cups 66. Each cutter forms a portion of a hollow conoid providing a curved wall extension arranged to at least partially enclose the core or pit during the cutting operation, and has a lower cutting edge substantially conforming to the cross section of the seed section of the half fruit to be cut.

The seed cutting members have a cycle of movements, one into the machine, and the other outwardly therefrom. The normal or rest position of the cutters is substantially that shown in Figure 2, except that the seed cutters or scoops 422 normally are disposed at a slightly higher elevation to insure that they will be clear of the paired fruit cups 66 as such cups are rotated into position therebeneath.

It will be noted that each of the cutting members for carrying out the pitting or coring operation comprises a substantially hollow portion or segment of a sphere which segments are pivotally mounted at the axis 423 which is located substantially directly over and relatively close to the center of the half pit or half core of the half fruit. It will also be noted that in the initial or open position of these cutters they are disposed on opposite sides of the pit or core adjacent the marginal portions of the pit or core and preferably slightly penetrate into the flesh of the fruit in such position. In this position, as shown, the arcuate or cutting edges of the opposed cutters form a substantially closed, curved plane following in general the curved plane outline of the half pit or half core that lies on the plane cut surface of the half fruit. When these opposed cutters are subsequently completely brought together, the arcuate cutting edges will meet whereby completely to sever the pit or core from the flesh and whereby completely to underlie and to form a substantial cup or container for the pit or core by which the pit or core may be isolated from the pitted or cored fruit and whereby the pit or core may be discharged free from the pitted or cored fruit.

By forming each of the cutters with a cutting edge which is substantially semi-spherical in its bottom contour, and by rotating these cutters in unison about a common center, which center is disposed relatively close to the central portion of the half pit or half core of the half fruit, as the cutters move in unison from open position to completely closed position these cutters will encompass and will cut a relatively shallow, substantially cup-shaped groove from the face of the fruit, which groove substantially corresponds with the area of the half pit or half core of the half fruit. Due to the location of this pivotal mounting and the construction of the cutters during their pitting or coring movement, they remove the minimum amount of flesh of the fruit with the pit or core.

In each of legs 402 is a shaft 404. At the end of said shafts 404 are cranks 405. Intermediate extended ends of cranks 405 is a shaft 406. For actuating the shafts 406, there is an arm 407 integral with one of cranks 405. Attached to the arm 407 is a link 408, which is connected at pivot 409 to a cam follower 185. The cam follower 185 is reciprocated vertically by a cam (not shown) which is useful also for the operation of parts of the machine other than the seed removing device.

Disposed in each of bracket legs 403 is a shaft 410. Connected to the shafts 410 are links 411. Intermediate the ends of the links 411 is a shaft 412 which shaft normally operates with its axis above the axis of the shaft 406 and in substantially the same perpendicular plane.

Around the shaft 406 and intermediate the cutter supports is a block 413. Said block 413 rides in a U-shaped end 414 of a guide member 415 which floats freely on the shaft 412. A piece 414a is suitably attached across the bifurcated ends of the guide member 415 to abut the bottom of block 413 and thereby limit the separation of shaft 406 and 412 caused by a compression spring 414b, which exerts a force between the upper face of the block 413 and the ceiling of an inverted recess 414c in the guide member 415. Depending from each end of the block 413 is a housing 416 about which the seed removing mechanism is disposed, each member 416 riding freely on the shaft 406.

Projecting from the shaft 412 and riding freely thereon are brackets 417 which have projecting bosses 418 in which are vertical square shafts 419 adjustably secured by means of set screws 419a. The rear portions of the members 416 includes sleeves 420 through which the shafts 419 may slidingly be moved.

Upon each side of the members 416 and secured thereto by machine screws or otherwise are two brackets 421. Between the brackets 421 and pivotally secured thereto are complemental opposed substantially hemispherical scoops or cutters 422, the point of pivot being indicated by the numeral 423.

On the back of each of the concaved cutters or scoops 422 is a boss 424 which provides a support for a link 425, which is secured to the shaft 419. Squared shaft 419 being movable relatively to the housing 416, its movement downwardly through the sleeve portion 420 thereof causes the concaved cutters 422 to approach one another to a closed position, while movement in the opposite direction of the shaft 419 will cause such members 422 to open.

Upon one of the links 411 is a bracket 430 carrying a roller bearing 431. Complemental thereto is a peripheral cam 432 which cam 432 is secured to the link 405 at the right of the device (Figure 3). This cam and roller govern the distance between the shafts 406 and 412 during the outward thrust of said shafts 406 before the point of highest elevation incident to such thrust is obtained by said shafts 406. Because of the inertia of the shaft 412 and the parts depending therefrom there is a tendency of said shafts at this time to compress the spring 414b and approach one another.

From the shaft 412 projects a pin 433 square in cross section. In association with such pin is a hook 434, which hook is mounted upon the upper end of a rod 619. A spring 619a pressing between a guide bracket 619b attached to the frame member 43 and the base of the hook member 434 constantly urges the hook and rod 619 upwardly. During the operation of the device a cam (not shown), and which serves to operate other parts of the device (not shown), serves jointly with the spring 619a to move the rod 619 and the hook upwardly and downwardly in timed relation to the movement of the coring device inwardly and outwardly of the frame of the machine.

The cycle of operations of the seed excising means is substantially as follows. While a pair of the fruit cups 66 are being moved to the seed removing station between the frame members 42 and 43 where they remain a short period, the seed cutting means is being moved inwardly of the machine incidental to an upward movement of the rod 408 whereby to place the cutting members 422 over the half fruit 235 in the respective cups with which the cutting members are to cooperate. The rod 408 finishes its upward movement after the cups 66 have come to rest at the seed excising station to carry the lower sharpened edges of the cutters, which are then open in some such manner as is illustrated in Figure 2, against the flat face of the fruit about the seed section thereof. About the time the opened cutters come in contact with the face of the fruit, the upward movement of the rod 408 is stopped and hence, the downward movement of the housing 416 and the arms 421 in support of the cutters stop. At this time motion is imparted to the rod 619 and hook 434 by means of the cam hereinabove mentioned as not being shown in the drawing. The downward movement of the hook 434 is such as to cause it to engage the square pin 433, thus drawing the shaft 412 closer to shaft 406 against the urge of the spring 414b. Such downward movement of the hook 434 and hence of the shaft 412 causes the cutters 422 to pivot at 423 toward a closed position, the movement being to partly close the cutters whereby to cause them to cut into the face of the fruit to acquire a firm grasp thereof. The cutters are so arranged that the downward movement thereof is across the cords or strings extending axially of the fruit. In this manner the cutters 422 are made to partly surround the seed material of the fruit.

A retrogressive movement is then imparted to the rod 619 and the hook 434. A like movement is imparted to the rod 408 to cause the lever 405 to turn in a clockwise direction (Figures 1 and 2). As the two shafts 406 and 412 are moved arcuately upwardly and outwardly of the machine, the pin 433 is drawn out from under the hook 434 so that if it were not for the fact that the upward movement of the seed cutting device is one of acceleration, the spring 414b would cause the two shafts 406 and 412 to separate to draw the square shaft 419 upwardly through the sleeves 420 to loosen the grip of the concaved cutters 422 upon the half fruit.

It will be noted that as the rod 408 is moved downwardly at a uniform rate of speed and as the arm 407 and the rod 408 near the alined position as shown in Figure 1, the angular velocity of the arms 407 and 405 about the axis in the shaft 404 is increased. Hence, the rate at which the parts of the device carried upon the shaft 412 are elevated is increased, the inertia of those parts being sufficient to overcome the force of the spring 414b urging them upwardly with respect to the shaft 406. That is, the spring 414b is comparatively weak so that it is but slightly stronger than is necessary to maintain the shafts 406 and 412 in a spaced apart relation against the force of gravity when the parts of the device are stationary.

During the upward arcuate movement of the seed cutting device the roller 431 is brought to bear upon the curved edge of the cam 432. The roller 431 and cam 432 preclude the shafts 406 and 412 approaching one another prematurely, because of the inertia of the parts carried upon the shaft 412 as above explained. Hence, the concaved cutters do not complete their cut through the body of the fruit. Such cut if completed would allow the fruit to drop before being carried completely from the machine.

The peripheral contour of the cam 432 is such as to maintain the shafts 406 and 412 at substantially the same vertical spacing while the device is being carried upwardly and outwardly of the machine. Shortly before the cutters reach the zenith of their arcuate outward movement, the roller 431 passes over the shoulder 432a to permit the shaft 406 to be moved toward the shaft 412. This movement causes the cutters to complete their cut about the seed of the fruit. Inasmuch as the fruit 235 is moving outwardly of the machine at the time the cut about the core is completed and the fruit released, the fruit is catapulted from the machine. A moving conveyor or suitable container or a liquid trough may be disposed in the path of the catapulted fruit.

It will be noted that the pitting and coring cutters will have cut partially through the flesh of the half fruit and in so doing will pass under and around the underside of the pit or core so that the opposed cutting edges will substantially underlie the pit or core, leaving therebetween an uncut section of the fruit which joins the pit or core. When the head 416 moves upward, these pitting or coring cutters will be carried upwardly and held stationary in their partially coring or pitting position. This will lift the half fruit out of the cup and suspend it solely by the relatively narrow, uncut, central section of the fruit, the two cutters firmly holding the core or pit within them. Due to the weight of the fruit in such suspended position, the body of the fruit will tend to pull downwardly on the uncut portion along its entire extent where it is integral with the pit or core whereby in the subsequent cutting or pitting operation when the opposed cutters are operated to come together to complete the cutting or pitting operation the flesh will be pulled downwardly so that the cutters will more closely follow the marginal lines of the pit or core and a cleaner cut will be made. The cut will take the minimum of flesh with the pit or core.

In short, the weight of the fruit will tend to pull downwardly on the uncut zone that is joined with the core or pit which downward movement of the flesh of the fruit will permit the cuting edges of the cutter more closely to approach the true core or pit of the fruit and thus a more effective cutting or pitting action will be provided.

The remainder of the outward arcuate movement of the cutting device is downwardly so that the inertia heretofore caused by the parts of the device carried upon the shaft 412 no longer exists to prevent the two shafts 406 and 412 being separated by the spring 414b. Incidental to the separation of the shafts 406 and 412 while outwardly of the machine, the cutters 422 are opened to allow the fruit seed to drop therefrom. Thereafter the rod 408 ceases its downward movement and subsequently it is moved upwardly at the beginning of a cycle of operation of the device similar to that just described. While the cutting means is being moved inwardly of the machine because of the upward movement of the rod 408, the spider 63 is being given a rotative movement to conduct the cups 66 from the seed excising station and to place a different pair of such cups at the station, the succeeding pair of cups being loaded with fruit from which the seed has not been cut.

It will be noted by examination of the figures of the drawings that the pivotal point 423 of the substantially scoop-shaped cutters 422 is located above the cut face of the fruit to be pitted or cored a predetermined distance which is selected so that the cutters make a substantially shallow scoop-shaped opening in the face of the fruit removing just sufficient of the flesh of the fruit to completely excise the pit or the core of the fruit. It will also be noted that by positioning the cutting edges of the scoops transversely of the longitudinal axis of the fruit, the cutting edges will first cut across the cords or strings extending axially of the fruit and will then move simultaneously through the flesh of the fruit closely adjacent the border or marginal line of the core or pit. It will be further noted that the depth of the cut in the fruit is substantially equal to one-half of the diameter of the cutters and that this pivotal point 423 is positioned during the cut, such that the pivotal point is positioned above the cut face of the disc a distance substantially equal to the radius of the cutters.

This device, as is readily understood, provides an efficient seed excising device. It also is a conveyor or discharge means to lift the halved body of the fruit from the machine. The direction of discharge is longitudinally of the axis of the fruit and fruit holding cup.

What is claimed as new and is desired to be secured by Letters Patent of the United States is:

1. Fruit treating apparatus comprising a cup to hold fruit, a member traveling toward said cup and away therefrom, coring scoops on said member, means for opening said scoops when said scoops are away from said cup, means for advancing said scoops toward one another when said member has approached said cup, means for advancing said scoops to contacting position after said member has moved away from said cup, and means for spreading said scoops when said member is intermediate said first and said second named positions.

2. A fruit treating apparatus comprising a cup for fruit, a member movable toward and away from said cup, means for causing said member to travel toward and away from said cup, scoops on said member, and means for advancing said scoops toward one another a limited distance when said member is in proximity to said cup, moving said scoops into contact with one another when said member is away from said cup, and separating said scoops before again reaching proximity to said cup.

3. A coring device for fruit, comprising a cup, a lifter, opposed movable scoops in said lifter, means for moving said lifter, means for regulating the spaced relation of said scoops, and means for causing said regulating means to partly close said scoops when said lifter registers with said cup and to completely close said scoops after said lifter has cleared said cup.

4. In fruit treating mechanism, a boom, means for angularly and linearly moving said boom along a fixed path, a fruit receptacle at one end of such path, a coring device on said boom comprising opposed members insertable into a fruit in said receptacle, and means for actuating said opposed members and said boom to grip such fruit and to lift such fruit away from said receptacle and to subsequently further actuate said opposed members to core such fruit during movement of said boom away from said receptacle to the other end of such path.

5. In fruit treating apparatus, a support, coring blades upon said support, a fruit receptacle, means for moving said support linearly and angularly toward and away from said receptacle, and means for spreading said blades as said support approaches said receptacle, actuating said blades to make a partial closing movement coincidentally with the reversal of the movement of said support, and further actuating said blade to make a complete closing movement after the initial retraction of said support from said receptacle.

6. Fruit coring means comprising a travelling member, scoops on said movable member and having cutting edges at their outer peripheries, means for moving said travelling member over a predetermined path from a first station to a second station and back again, means operable to spread said scoops as said member moves from the first station to the second to open said scoops for entry into fruit about the core thereof, means to partially close said scoops at the second station to grip the fruit that it may be lifted by the travelling member, and means to completely close the scoops to separate the core from the fruit as said travelling member is moved back to the first station from the second station.

7. Fruit coring and discharging apparatus comprising a travelling member, movable scoops upon said travelling member and having cutting edges, means for moving said travelling member from a first extreme position to a second extreme position and back again, and means for actuating said scoops to separate them before said scoops approach a half fruit at such second extreme position of said travelling member to facilitate entry of the scoops into such fruit about the core thereof, means to thereafter partially close the scoops upon the core portion of the fruit at said second extreme position that the fruit may be elevated by said scoops, and means to finally completely close said scoops while said member is between the second extreme position and the first extreme position to free the core from the fruit and to discharge the fruit from the travelling member.

8. A machine for coring or pitting half fruit comprising means forming a fruit holder adapted to hold a half fruit with its cut face carrying the pit or core uppermost, means for moving said fruit holders to a pitting or coring station, a pair of cutters mounted at said station, means for moving said cutters relatively to the fruit to position said cutters on opposite sides of a desired zone on the cut face of the fruit, each of said cutters comprising a portion of a hollow sphere having a substantially semi-circular lower cutting edge, means for moving said cutters to cause them partly to cut through the flesh of the fruit in a predetermined arcuate path relatively to the central zone of the flesh to be cut, said arcuate path having a central axis disposed relatively close to the face of the fruit at the central portion of said zone to be cut, and means for momentarily arresting said cutting action leaving an integral uncut portion of the flesh of the fruit integrally joining the area or zone to be cut, and means for thereafter completing the arcuate movement of the said cutters to bring the same together while causing a downward movement of the body of the fruit thereby depressing the uncut portion while the cutters are passing therethrough.

9. In a device for treating fruit the combination of means forming a fruit holder adapted to receive a half fruit with its cut face exposed, a pair of cutters each comprising a portion of a hollow conoid and each having a cutting edge substantially conforming to the cross section of the seed-containing section of the half fruit, means for positioning said cutters on opposite sides of the cut face of the fruit relative to the seed-containing section of said fruit, means for moving said cutters from such position in arcuate paths around the border lines of said seed-containing section to a position such that said cutting edges of said cutters meet and means operable during a predetermined portion of the approaching movement of said cutters for producing a recessive movement relatively between the flesh of the fruit which is yet uncut and lies in the path of movement of said cutters and said cutters in a direction substantially transversely to said path whereby to cause said cutters to make a shallower cut.

10. The method of cutting a half fruit which comprises forming simultaneous cuts beginning at the face of the half fruit and cutting through the flesh of the fruit and along the border of the core or pit of the fruit in approaching directions until said lines of cut meet while producing a receding stress upon the body of the fruit prior to the completion of the cutting whereby to cause a receding movement upon the uncut zone of fruit lying between the approaching lines of cut whereby automatically to cause said lines of cut to produce a more shallow cut in the fruit.

11. The method of cutting or pitting a half fruit which comprises forming simultaneous cuts in the flesh of the fruit at the face of the fruit on opposite sides of the core or the pit and moving arcuately around and beneath the core or pit of the fruit in approaching directions, holding stationary the core or pit of the fruit while completing the lines of cut beneath the fruit while simultaneously causing the weight of the fruit to pull downwardly upon the unsevered section of the fruit integrally adjoining the core or pit whereby to cause the cutters to take a shallower cut and more closely follow the core or pit of the fruit.

12. An automatic machine for coring or pitting fruit comprising means for holding a half fruit with its cut face exposed carrying the pit or core, means for moving the fruit holder to a pitting or coring station with the longitudinal axis of the half fruit extending in a predetermined direction, means providing a pair of cutters each having a curved cutting edge substantially conforming to the cross section of the pit or core of the fruit, means for positioning the cutters into contact with the flesh of the fruit at the cut face thereof and with the cutting edges lying in opposed relation substantially at the margin of the pit or core of the fruit and transversely of the longitudinal axis of the fruit, means for arcuately moving the cutters toward each other whereby to cause them to pivot about an axis extending transversely of the longitudinal axis of the fruit to cause said cutters to sever the pit or core from the fruit, and means for exerting a force on the flesh of the fruit in a direction to cause relative movement away from the pit or core of the fruit during the severance of the flesh of the fruit by said cutter.

13. In a device for treating fruit the combination of means forming a fruit holder adapted to receive a half fruit with its cut face outermost, a pair of cutters each having a curved cutting edge corresponding in curvature to the marginal portion of the seed containing section desired to be cut and each having a curved wall extending outwardly from the cutting edge to provide a walled portion for enclosing a portion of the seed containing section when the latter is cut, means for positioning said cutters relatively close to the cut face of the half fruit and on opposite sides of the cut face of the fruit relative to the seed containing section to be cut, means for holding said cutters in said position while moving said cutters in arcuate paths around the border lines of said section to a position such that said cutting edges of said cutters meet and such that the walled portion partially encloses the seed-containing section whereby to hold the same from displacement during the cutting operation, and means operable during a predetermined portion of the approaching movement of said cutters for producing a recessive movement between the seed-containing section and the flesh of the fruit which is yet uncut and lies in the path of movement of said cutters whereby to cause said cutters to make a shallower cut.

14. In a device for treating half fruit the combination of means forming a fruit holder adapted to receive a half fruit with its cut face exposed, complementary cutting means each comprising a cutting edge of curved outline conforming to the marginal portion of the seed containing section desired to be cut, means for positioning said cutters on opposite sides of the cut face of the half fruit relative to the seed containing section to be cut, means for moving said cutters from said position in arcuate paths around the border lines of said seed containing section to be cut to a position such that said cutting edges of said cutters meet, means operable during a predetermined portion of the approaching movement of said cutters for producing a force upon the flesh of the fruit which is yet uncut and lies in the path of movement of said cutters, in a direction relatively away from the seed containing section, said cutters holding said seed containing section against movement in said direction during said predetermined portion of the approaching movement of said cutters.

15. In an automatic machine for coring or pitting fruit, the combination of means forming a fruit holder adapted to receive half fruit with the cut face uppermost, means for moving said fruit holder carrying such half fruit to a pitting or coring station, means at said station comprising a pair of oppositely disposed cutters, each having a curved wall extension arranged to at least partly enclose the core or pit during the cutting operation and each having a lower curved cutting edge conforming substantially to the general shape of the pit or core of the half fruit, means for positioning each of said cutters on opposite sides of the pit or core of the half fruit at the cut face of the fruit and means for arcuately moving said cutters about an axis disposed centrally of and closely adjacent the central portion of the core or pit of the half fruit whereby to cause said cutters to approach and substantially come together beneath the core or pit of the fruit to sever the same in a relatively shallow cut from the half fruit, and means for causing the cored or pitted fruit, and the coring or pitting means to move away from one another relatively, said coring or pitting mechanism carrying the core or pit of the fruit from the fruit.

16. In an automatic coring or pitting device for half fruit, the combination of means forming a succession of fruit holders each adapted to receive a half fruit with its cut face uppermost, means for moving said fruit holders in succession to a coring or pitting station, means comprising a pair of opposed cutters each comprising a curved pit or core enclosing wall portion and each having a lower cutting edge curved substantially to conform to the pit or core of the half fruit, means for positioning said cutters in opposed relation at the face of the fruit on opposite sides of the core or the pit, means for causing said cutters to cut arcuately through the flesh of the fruit and to approach each other beneath the core or pit of the fruit while severing the same, means for raising said cutters carrying the pit or core and the fruit attached thereto by an uncut portion, means for laterally shifting the cutters, means for completing the cutting operation of said cutters, means for projecting the cored or pitted fruit into a conveyor and for projecting the pit or core into a second conveyor.

17. In a device for treating fruit the combination of an intermittently operable turret provided with a plurality of holding devices each adapted to hold a half fruit with its cut face outermost, means providing a cutting station at which the seed containing portion of the half fruit is cut therefrom, means for intermittently advancing each fruit holding means on the turret toward and from said station, a pair of cutters disposed at said station, means for bodily moving said cutters, each of said cutters having a curved edge shaped to conform to the half-outline of the seed containing section of the fruit, means for bodily moving said cutters to position same on opposite sides of the seed containing section and for causing said cutters arcuately to cut through the flesh of the half fruit to sever the seed containing section, said cutters each being provided with a curved extension wall forming a means for partially enclosing and holding the seed containing section when cut, and means to discharge the half fruit with the seed containing section cut therefrom and separately to discharge the cut seed containing section.

18. The method of cutting or pitting a half fruit which comprises forming simultaneous cuts in the flesh of the fruit at the face of the fruit on opposite sides of the core or the pit and moving arcuately around and beneath the core or pit of the fruit in approaching directions, moving upwardly the core or pit of the fruit while completing the lines of cut beneath the fruit while simultaneously causing a force to be exerted upon the uncut flesh of the fruit lying between the approaching lines of cut in a direction away from the pit or core whereby to cause a recessive movement upon the uncut flesh of the fruit and thereby cause the cutters to take a shallower cut and more closely follow the core or pit of the fruit.

19. In a device for treating fruit the combination of means forming a fruit holder adapted to receive a half fruit with its cut face uppermost, a pair of cutters each having a curved cutting edge corresponding in curvature to the marginal portion of the seed containing section desired to be cut and each having a curved wall extending outwardly from the cutting edge to provide a walled portion for enclosing a portion of the seed containing section when the latter is cut, means for positioning said cutters at a predetermined distance from the cut face of the half fruit and on opposite sides of the cut face of the fruit relative to the seed containing section to be cut, means for holding said cutters in said position while moving said cutters in arcuate paths beneath and around the border lines of said section to a position such that said cutting edges of said cutters meet and such that the walled portion partially encloses the seed containing section whereby to hold the same from displacement during the cutting operation, and means operable during a predetermined portion of the approaching movement of said cutters for producing a force upon the flesh of the fruit which is yet uncut and lies in the path of movement of said cutters in a direction away from the seed containing section whereby to cause a recessive movement upon the uncut flesh and thereby cause said cutters to make a shallower cut.

20. In a device for treating half fruit, the combination of means forming a fruit holder adapted to receive a half fruit with its cut face exposed, complementary cutting means each comprising a cutting edge of curved outline conforming to the marginal portion of the seed containing section desired to be cut, means for positioning said cutters on opposite sides of the cut face of the half fruit relative to the seed containing section to be cut, means for moving said cutters from said position in arcuate paths around the border lines of said seed containing section to be cut to a position such that said cutting edges of said cutters meet, means operable during a predetermined portion of the approaching movement of said cutters for producing a force upon the flesh of the fruit which is yet uncut and lies in the path of movement of said cutters, in a direction away from the seed containing section whereby to cause a recessive movement upon the uncut flesh of the fruit, and means for holding said seed containing section against movement in said direction during said predetermined portion of the approaching movement of said cutters.

21. In a device for treating half fruit, the combination of means forming a holder adapted to receive a half fruit with its cut face exposed, cutting means having a portion of a hollow conoid and having a lower cutting edge substantially conforming to the cross section of the seed-containing section of the half fruit, means for positioning the cutting means laterally of the seed-containing section of the half fruit at the exposed cut face, means for moving the cutting means from such position to form a complete arcuate cut around the border lines of said seed-containing section, said cut extending from the cut face on one side of said seed-containing section to the opposite side of said seed-containing section, and means operable during the formation of said line of cut for producing a recessive movement relatively between the cutting means and the flesh of the half fruit which is yet uncut and which lies in the path of movement of said cutting means, said recessive movement being produced, in a direction substantially transversely to said path of movement of the cutting means whereby to cause said cutting means to make a shallower cut.

22. The method of cutting a half fruit which comprises forming an arcuate cut which has its terminals at the cut face of the half fruit on opposite sides of the seed-containing section and which borders the core or pit of the half fruit, while producing receding stress upon the body of the half fruit prior to the completion of the line of cut whereby to cause receding movement upon the uncut zone of fruit lying in advance of the fruit flesh about to be cut, whereby automatically to cause said line of cut to produce a more shallow cut in the fruit about the seed-containing section.

23. The method of cutting or pitting a half fruit which comprises forming an arcuate cut in the flesh of the half fruit, which cut begins at the face of the half fruit and moves arcuately around and beneath the core or pit of the fruit, and holding the core or pit of the fruit from downward movement while said line of cut is being formed, while simultaneously causing the weight of the half fruit to pull downwardly upon the unsevered section of the flesh of the fruit integrally adjoining the core or pit, whereby to cause the line of cut to more closely follow the core or pit of the half fruit.

24. In a device for treating half fruit, the combination of means forming a fruit holder adapted to receive a half fruit with its cut face exposed, cutting means comprising a cutting edge of curved outline conforming to the marginal portion of the seed-containing section desired to be cut, means for positioning such cutting means to one side of the cut face of the half fruit relative to the seed-containing section and for moving said cutting means from such position in an arcuate path in a direction to pass about the border of the seed-containing section to be cut, and means operable during such movement of the cutting means for producing a force upon the half fruit which lies in the path of movement of the cutting means in a receding direction relative to the cutting means.

25. In a device for treating half fruit, the combination of means forming a fruit holder adapted to receive a half fruit with its cut face exposed, cutting means comprising a cutting edge of curved outline conforming to the marginal portion of the seed-containing section desired to be cut, means for positioning such cutting means at the cut face of the half fruit laterally of the seed-containing section and for moving said cutting means from such position in an arcuate path in a direction following the border of the seed-containing section to be cut, and means operable during such movement for producing a force upon the flesh of the half fruit which is yet uncut and lies in the path of movement of the cutting means, in a direction relatively away from the seed-containing section, said cutting means being formed to hold the seed-containing section against movement in said direction during the time said stress is produced.

26. The method of cutting or pitting a half fruit which comprises forming an arcuate cut through the flesh of the fruit beginning at the face of the half fruit and moving arcuately around and beneath the core or pit of the fruit, and moving upwardly the core or pit of the half fruit while said arcuate cut is being formed and while simultaneously causing a force to be exerted upon the uncut flesh of the fruit lying ahead of the line of cut while being formed, said force being exerted in a direction away from the pit or core whereby to cause a recessive movement upon the uncut flesh and thereby cause a shallower cut more closely following the pit or core.

27. In a device for treating half fruit, the combination of means forming a fruit holder adapted to receive a half fruit with its cut face exposed, cutting means comprising a cutting edge of curved outline conforming to the marginal portion of the seed-containing section desired to be cut, means for positioning said cutting means to one side of the cut face of the half fruit relative to the seed-containing section to be cut, means for moving said cutting means from such position arcuately following the border line of the seed-containing section to be cut, means operable during a predetermined portion of the arcuate movement of said cutting means for producing a force upon the flesh of the fruit which is yet uncut and which lies in the path of movement of the cutting means, in a direction away from the seed-containing section whereby to cause a recessive movement upon the uncut flesh of the fruit, and means for holding said seed-containing section against movement in said direction during said predetermined portion of the movement of the cutting means.

28. In a device for treating half fruit, the combination of means forming a fruit holder adapted to receive a half fruit with its cut face exposed, cutting means comprising a cutting edge of curved outline conforming to the marginal portion of the seed-containing section desired to be cut, means for positioning said cutting means to one side of the cut face of the half fruit relative to the seed-containing section to be cut, means for moving said cutting means from such position arcuately following the border line of the seed-containing section to be cut, and means operable during a predetermined portion of the arcuate movement of said cutting means for producing a force upon the flesh of the fruit which is yet uncut and which lies in the path of movement of the cutting means, in a direction away from the seed-containing section whereby to cause a recessive movement upon the uncut flesh of the fruit, said cutting means including means adapted partially to embrace the severed portion of the seed-containing section for holding the same against movement in said direction during said predetermined portion of the movement of the cutting means.

MARK EWALD.